United States Patent
Khanuja

(10) Patent No.: US 9,347,820 B2
(45) Date of Patent: May 24, 2016

(54) BODY WEIGHT MEASURING TECHNIQUES

(71) Applicant: Carematix, Inc., Chicago, IL (US)

(72) Inventor: Sukhwant Singh Khanuja, Chicago, IL (US)

(73) Assignee: CAREMATIX, INC., Chicago, IL (US)

( * ) Notice: Subject to any disclaimer, the term of this patent is extended or adjusted under 35 U.S.C. 154(b) by 59 days.

(21) Appl. No.: 14/085,266

(22) Filed: Nov. 20, 2013

(65) Prior Publication Data

US 2014/0138164 A1    May 22, 2014

Related U.S. Application Data

(60) Provisional application No. 61/728,787, filed on Nov. 20, 2012.

(51) Int. Cl.
*G01G 19/44* (2006.01)
*G01G 23/365* (2006.01)
*G01G 23/37* (2006.01)

(52) U.S. Cl.
CPC ............ *G01G 19/44* (2013.01); *G01G 23/3735* (2013.01)

(58) Field of Classification Search
CPC  G01G 19/44; G01G 23/3728; G01G 23/3735
See application file for complete search history.

(56) References Cited

U.S. PATENT DOCUMENTS

| | | | |
|---|---|---|---|
| 3,826,319 A * | 7/1974 | Loshbough | 177/25.15 |
| 4,082,153 A * | 4/1978 | Provi | 177/177 |
| 4,328,874 A * | 5/1982 | Gumberich et al. | 177/25.14 |
| 6,538,215 B2 | 3/2003 | Montagnino | |
| 6,781,067 B2 * | 8/2004 | Montagnino et al. | 177/25.13 |
| 6,956,175 B1 | 10/2005 | Daly | |
| 7,541,547 B2 * | 6/2009 | McGuire et al. | 177/25.13 |
| 8,536,469 B2 * | 9/2013 | Sato et al. | 177/25.13 |
| 2004/0168836 A1 | 9/2004 | Petrucelli | |
| 2010/0012393 A1 * | 1/2010 | Tanida et al. | 177/25.13 |
| 2014/0083779 A1 * | 3/2014 | Sharma | 177/1 |

OTHER PUBLICATIONS

PCT, Notification of Transmittal of the International Search Report and the Written Opinion of the International Searching Authority, or the Declaration, in International Application No. PCT/US2013/071007, dated Apr. 14, 2014. (14 pages).

* cited by examiner

*Primary Examiner* — Randy W Gibson
(74) *Attorney, Agent, or Firm* — Mcandrews, Held & Malloy, Ltd.

(57) ABSTRACT

According to certain inventive techniques, a body weight measuring device measures a weight of a load over a period of time to generate a reading. The body weight measuring device includes a plurality of load sensors, a radio, at least one processor, and a display. The plurality of load sensors is configured to generate load information during the reading. The load information includes a plurality of measurements from each of the plurality of load sensors received over the period of time. The radio is configured to wirelessly transmit reading information. The at least one processor is configured to receive the load information from the plurality of load sensors, analyze the load information to determine weight information, analyze at least one of the load information or the weight information to determine stability information, communicate the reading information to the radio. The reading information comprises the load information and the stability information. The display is configured to receive and display the weight information.

18 Claims, 8 Drawing Sheets

BODY WEIGHT MEASURING TECHNIQUES

CROSS REFERENCE TO RELATED APPLICATIONS

This application claims priority to U.S. Patent Application No. 61/728,787 filed on Nov. 20, 2012, the entirety of which is herein incorporated by reference.

FEDERALLY SPONSORED RESEARCH OR DEVELOPMENT

[Not Applicable]

JOINT RESEARCH AGREEMENT

[Not Applicable]

SEQUENCE LISTING

[Not Applicable]

BACKGROUND

The present invention generally relates to a measuring device and particularly relates to a body weight measuring device for one or more users. The present invention more particularly relates to a Wi-Fi enabled advanced and accurate body weight measuring device for storing the measured weight readings in a server.

The weight of a person is generally referred to as a body weight of the person. Scientifically, a weight of any object is the total mass of the object and an effect of gravity on the object. The unit of weight may for example be kilograms (kg), pounds (lb.), or stones (st).

There are number of devices available at present, to measure the weight of an object of different sizes and shapes. In hospitals, a doctor uses a medical weight measuring device to measure a weight of the patient for analysis. Jewelers use milligram scales to measure a weight of gold, silver and other delicate ornaments. Chemists and druggists use analytical scales to measure the weight of chemical powders to a very high degree of precision. There are different scales used for different purposes.

One of the prior art methods provide a system for measuring a weight of a user that does not provide accuracy of weight measurement when the user is not able to stand still on the weighing device (for example, due to old age problems or some disease). Another prior method provides a digital display screen with memory for different users, but does not provide a given user an easy way of uniquely identifying themselves.

Hence, there may be need for a weighing device with an easily readable digital display screen along with alphanumeric readings optionally including decimal points for the measured reading. Further there may be a need to provide a weighing device with configurable buttons and a memory to facilitate a plurality users to store and process the past and the current weight readings in a single weighing device. There may also be a need to assess the stability of a user when the weight over the weighing device fluctuates. Still further there may be a need for a weighing device to store measured readings as well as user details in a server via a wireless connection (for example, a Wi-Fi connection).

The abovementioned shortcomings, disadvantages and problems are addressed herein and which will be understood by reading and studying the following specification.

SUMMARY

One aspect of one or more embodiments of the present invention may be to provide an accurate body weight measuring device (for example, a scale) to measure the body weight of various kinds of users.

Yet another aspect of one or more embodiments of the present invention may be to provide a method to accurately measure a fluctuating body weight of the user due to imbalance.

Yet another aspect of one or more embodiments of the present invention may be to provide a storage unit in the body weight measuring device to store the measured weight and other details like date and time of weight reading of one or more users.

Yet another aspect of one or more embodiments of the present invention may be to provide one or more multifunction configurable buttons to switch ON the weighing device and measure weight while identifying the button pressed.

Yet another aspect may be to provide reminders to users to complete tasks like take weight reading as preconfigured on the web portal by using illuminated buttons on the scale, audible beeps and using the display screen to display a message.

Yet another aspect of one or more embodiments of the present invention may be to provide a method and a system for storing the measured weight of the user in a server with date and time stamp of the weight reading by transmission of data from the body weight measuring device through a wireless communication network and to the server.

Yet another aspect of one or more embodiments of the present invention may be to provide a portal where a user logs-in and reviews stored measured weight details in the server.

Yet another aspect of one or more embodiments of the present invention may be to provide a method and system for storing and updating measured weight (and/or other data like body mass index ("BMI"), body fat, and stability) to and from the server through a radio (for example, a Wi-Fi transceiver).

According to certain inventive techniques, a body weight measuring device for measuring a weight of a load over a period of time to generate a reading includes load sensors (for example, four load sensors), a radio, at least one processor, and a display. The plurality of load sensors generates load information during the reading, wherein the load information includes measurements from each of the plurality of load sensors received over the period of time. The radio wirelessly transmits reading information, for example, to a wireless access point. The least one processor receives the load information from the plurality of load sensors, analyzes the load information to determine weight information, analyzes the load information or the weight information to determine stability information, and communicates the reading information to the radio, wherein the reading information comprises the load information and the stability information. The reading information may also include time stamp information that corresponds to a circadian time at which the reading was taken. The stability information may include information relating to a time duration during which the weight information was stabilizing during the reading. The stability information may include a series of readings from each of the load sensors over a period of time. The display receives and displays the weight information. The display may display the stability information also. The body weight measuring device may have a plurality of user selection buttons configured to select different ones of a plurality of users. In this case, the at least one processor may include information identifying the selected user in the reading information.

According to certain inventive techniques, a method for measuring a weight of a load on a body weight measuring device over a period of time to generate a reading includes generating load information with load sensors (for example, four sensors) during the reading. The load information includes measurements from each of the load sensors received over the period of time. The method also includes generating reading information by analyzing, with at least one processor, the load information to determine weight information. The method further includes analyzing, with the at least one processor, the load information or the weight information to determine stability information. The reading information includes the weight information and the stability information. The reading information may also include time stamp information that corresponds to a circadian time at which the reading was taken. The stability information may include information relating to a time duration during which the weight information was stabilizing during the reading. The stability information may include a series of readings from each of the load sensors over a period of time. The method also includes wirelessly transmitting the reading information, for example, to a wireless access point via a radio, and displaying the weight information on a display. The display may display the stability information also.

According to certain inventive techniques, a weight measuring system includes a body weight measuring device and a server. The body weight measuring device includes a radio, an alert indicator (for example, a speaker and/or a lamp such as a kick button illuminator), a memory, a time clock, and at least one processor. The radio wirelessly receives at least one weight reading time (for example, weight reading times for a first and second user). The weight reading time may include day-of-week information. The memory stores the at least one weight reading time. The at least one processor is configured to compare the at least one weight reading time with a current time of the time clock. It is also configured to cause the alert indicator to emit the alert if the current time of the time clock is greater than or equal to the at least one weight reading time. The server is configured to receive the at least one weight reading time from a portal and transmit the at least one weight reading time to the body weight measuring device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Figure 1:
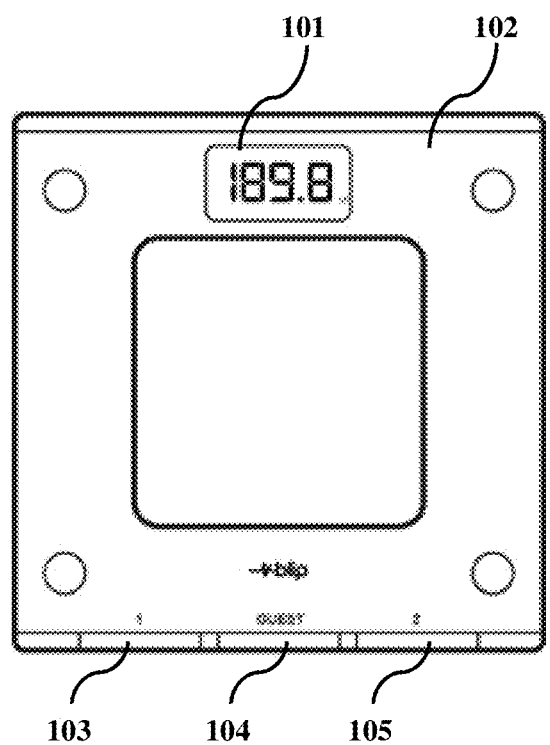
FIG. 1 illustrates a top view of a body weight measuring device, according to one embodiment of the present invention.

Although the specific features of one or more embodiments of the present invention are shown in some drawings and not in others. This is done for convenience only as each feature may be combined with any or all of the other features in accordance with certain inventive techniques. The foregoing summary, as well as the following detailed description of certain inventive techniques, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

One or more embodiments of the present invention provide a body weight measuring device for measuring the body weight of the user. The body weight measuring device may include a base for standing, a plurality of load sensors (for example, four sensors), one or more multifunction buttons (for example, two configurable and one nonconfigurable button for switching ON the body weight measuring device and measuring weight), a processor for processing load sensor data, a digital display screen to display the processed measured weight, a storage unit for storing the processed measured weight, one or more batteries for powering the body weight measuring device, a Wi-Fi transceiver embedded in the body weight measuring device for transmitting the stored details to the server and a portal for establishing a connection between the user and the server.

According to one embodiment of the present invention, the base consists of a platform with a top surface. The platform further consists of a plurality of load sensors and the top surface may be placed over the plurality of load sensors. The top surface may be made of a glass. When a user stands on the base of the body weight measuring device, and the top surface may press on the load sensors on the platform to measure the user's weight. The measured weight may be displayed in the digital display screen. The digital display screen may be provided at the top middle section of the base. The body weight measuring device may further comprise multiple multifunction configurable buttons. One of the configurable buttons may be referred to as a guest button. The multifunction buttons may be provided on one or more of the sides (for example, all buttons on the front face) of the body weight measuring device. The processor and the storage unit may be provided inside the body weight measuring device to process and store the measured weight details respectively. At least one internal battery may be provided for powering the time clock in the body weight measuring device. The server may store the user details, preferences and measured weight details remotely. An embedded radio of the body weight measuring device may assist in acquiring a connection to the server by a wireless access point (for example, a Wi-Fi access point).

According to one embodiment of the present invention, the body weight measuring device comprises one or more batteries. The batteries may include an internal battery and an external battery. The internal battery may power the time clock in the body weight measuring device. The external battery powers general function such as switching ON the device, measuring weight of the user, processing (calculating BMI, Difference calculation) and displaying the result. The body weight measuring device may require only an external battery for general operation. The external battery may be also used to power the radio embedded in the body weight measuring device.

According to one embodiment of the present invention, the body weight measuring device may comprise one or more multifunction configurable buttons (for example, two configurable buttons) and at least one guest button. The first button may be configured to the user with the user details such as name, age, height, gender, etc. from a server. Similarly, the second button may be configured to a second user. The first or the second user actuates the respective configured button and measures the weight by standing on the base. The second user could also be assigned to first user, allowing the first user to use either first or second button. The measured weight may be stored in the storage unit corresponding to the button selected by the first and second users. Additional users may be configured on the guest button. An unconfigured user (hereinafter referred to as guest user) who wants to measure weight may actuate the guest button. The guest button may allow a guest user to measure their weight. The weight measured by using the guest button may also be stored in the storage unit.

According to one embodiment of the present invention, the body weight measuring device may be switched ON by pressing any of the configurable buttons or the guest button. Once switched ON, the body weight measuring device may remain active for a predefined time interval. When there is no action or response from the user within the predefined time, the body weight measuring device may switch OFF and conserve battery power.

According to one embodiment of the present invention, the body weight measuring device comprises a digital display screen. The digital display screen may be provided at the top middle section on the base. The digital display screen may display the following information, which is not limited to name, age, gender, current weight, BMI, last recorded weight, date time etc. The body weight measuring device may also display a differential weight by comparing the user's current weight with a previously measured weight. A processor may perform the comparison.

According to one embodiment of the present invention, the body weight measuring device stores the measured weight of the user in the storage unit. The details such as name, age, height, gender, last recorded weight, current weight, BMI etc. may be recorded in the storage unit corresponding to the configured buttons. When the first user again selects the respective configured button for measuring the weight in a later date/future, the body weight measuring device may display the current weight along with a comparison of the previously measured weight. The comparison may be performed with the processor. The processor may perform the comparison on the current weight and the last measured weight readings from the storage unit. The compared result may be displayed in the digital display screen. Also, the information stored in the storage unit may be transferred to a server when a connection may be established between the server and the body weight measuring device through a wireless link.

According to one embodiment of the present invention, the processor may be internally connected to the digital display screen, multifunctional configurable buttons, a guest button, and a radio. The processor may process the details stored in the storage unit and display the result on the digital display screen. The processor may also compare the measured weight of the user with a medical standard weight. The medical standard weight may be the standard weight of the user with respect to a height and an age. The processor may compare the medical standard weight with the measured weight of the user and display the weight difference along with an indication of overweight, underweight or balanced weight on the digital display screen.

According to one embodiment of the present invention, the storage unit stores a medical weight table as per medical standards for males and females. The medical weight table may include separate or a combined weight table for males and females based on height and age factors. When the first or second user measures weight in the body weight measuring device, the measured weight along with user's age and height may be stored in the storage unit. Based on the age and the height factors, the current measured weight may be compared with the corresponding standard weight in the medical weight table. The comparison may be performed by a processor. The compared result may be displayed on the digital display screen with a message indicating whether the user may be overweight, underweight, or balanced.

According to one embodiment of the present invention, the user measures weight. The measured weight may be stored in the storage unit of the body weight measuring device. The measured weight details stored in the storage unit of the body weight measuring device may be transferred to the server using the radio for permanent record, analysis, backup, and other requirements. The server may be updated any time as per feasibility. The user may link the server with the body weight measuring device to update the server with new measured details. The enabled radio may start transmitting wireless signals containing identification number of the body weight measuring device and user button number. The identification number may be unique for the body weight measuring device. The radio may search and connect to nearby computing devices. The computing devices include but are not limited to computers, PDAs, smart phones, tablets, net books, etc.

According to one embodiment of the present invention, the body weight measuring device and server are connected via a wireless router (for example, a Wi-Fi router). The body weight measuring device may go into access point mode when the radio may be switched ON by inserting battery into the slot. Further, the user can configure a computing device to now detect the wireless signals and establish a connection with the body weight measuring device and access the web page of the body weight measuring device. Still further, the user may enter the router name and network key in the web page and establish a network connection between the server and body weight measuring device through the router. Still further, the stored details of body weight measuring device or of the wireless router may be verified and any new stored details in the server may be updated.

According to one embodiment of the present invention, the user enters the user details like login, password, age, gender height, etc., using the body weight measuring device identification number and user number in the server via a portal. The user may measure weight by body weight measuring device and the weight may be recorded in the storage unit. The measured weight may be displayed on the digital display screen of the body weight measuring device. The display may comprise the user's name, current weight, time stamp, BMI, etc. The radio may transmit the stored measured weight related detail from the body weight measuring device to the access point using the radio. The access point may transmit the weight related detail to the server using a communication network (for example, the Internet).

According to one embodiment of the present invention, the communication network between the wireless router and server may be any of a broadband, telephone line, and/or cellular networks.

According to one embodiment of the present invention, the server may be adapted for the body weight measuring device. The server may be a central repository where user credentials such as name, age; and device details such as BMI, current weight, last recorded weight, identification number of the body weight measuring device are stored. The user may enter the user credentials and body weight measuring device details in the server through the portal. The server may be connected to body weight measuring device to update the server. The user may facilitate connecting the server to the body weight measuring device through the access point or router. After connecting, the server may check for any new recorded weight details stored in the body weight measuring device from the last updated date. If any new recorded weight detail is found in the body weight measuring device, the same may be updated in the server. The server may store measured weight details of the user with date and time stamp. The server may display weight details based on age and height factor. The portal also provides setting of reminder notification. The reminders may provide notification to the user regarding an unfinished task.

According to one embodiment of the present invention, the body weight measuring device provides reminder alerts to a user. The reminder may be in the form of notifications, which indicates a user about "unfinished" or "to be done" task. The reminder may be set by the user through the portal. The user may establish a connection between the server and the body weight measuring device. Once a desired reminder may be set via the portal, the server may forward reminder details to the body weight measuring device when the connection may be established between the server and the body weight measuring device. The server may update the body weight measuring device with reminder details set by the user. The body weight measuring device may provide reminders relating to any task, for example, for measuring weight. The reminder may be in the form of audible alarm, illumination etc.

According to one embodiment of the present invention, the body weight measuring device adopts a method to measure weight accurately. A general problem among old age people is known to be a senile tremor. The senile tremor is a term used to describe the problem of shaking legs (not able to stand still). When the user of this problem stands on the body weight measuring device, due to the senile tremor the user's weight in the digital display screen fluctuates. The attempt to stand still results in variation of the weight measurement in the body weight measuring device. The body weight measuring device may measure a user's weight accurately by taking an average of extreme values of the fluctuating reading—for example, the device may detect and calculate the average of the extreme values for the lowest allowable variation (say ±0.1 lbs.) in the weight after a fixed duration of time (say 10 or 12 seconds) after beginning to take the weight reading. It also tracks the time it takes to arrive at this averaged value. This time may be reported to the portal along with the weight reading and date and time stamp.

According to one embodiment of the present invention, the body weight measuring device may be portable and may be easily operated by a normal user or even by a semi-skilled person.

FIG. 1 illustrates a top view of the body weight measuring device (for example, a scale), according to one embodiment of the present invention. The body weight measuring device comprises a base 102. The base 102 provides a platform (for example, a platform) for measuring the weight of a first user. The first user stands on the base 102 and the body weight measuring device may measure the weight quickly. The measured weight of the user may be displayed on a digital display screen 101. The digital display screen 101 may be located at the top middle section of the base 102 as shown in FIG. 1. A storage unit (for example, volatile or non-volatile memory) may be provided beneath the base 102. The storage unit may store a newly measured weight reading along with a past history for the first user. The storage unit also may store a medical standard weight table including medical standard weight for a male or a female based on height and age factors, for example. The body weight measuring device may also measure the body weight of the first user accurately, when the weight over the weighing device is fluctuating, by calculating the average of extreme values for the lowest allowable variation (say ±0.1 lbs.) of the user's weight. The duration or number of readings taken to arrive at the averaged value may be reported to the portal along with the weight reading and date and time stamp. The multifunction configurable buttons 103 (User 1), 104 (User 2), and guest button 105 are provided on one of the sides (preferably on the front face) of the body weight measuring device. The first user selects the first button 103 and measures weight. The button 104 may be for the second user. The guest button 105 can be configured for up to a number of guest users (for example, eight guest users). Any guest user may be allowed to select the button 105 by repeated pressing the button to find their respective user number as displayed on the screen. The weight measured by selecting guest button 105 may be stored in the storage unit of body weight measuring device. Similar to first user, the second user follows the same procedure for measuring the weight. However, those skilled in the art may assign the above configurable buttons (103 and 104) in random manner among different users without any restriction.

Figure 2:
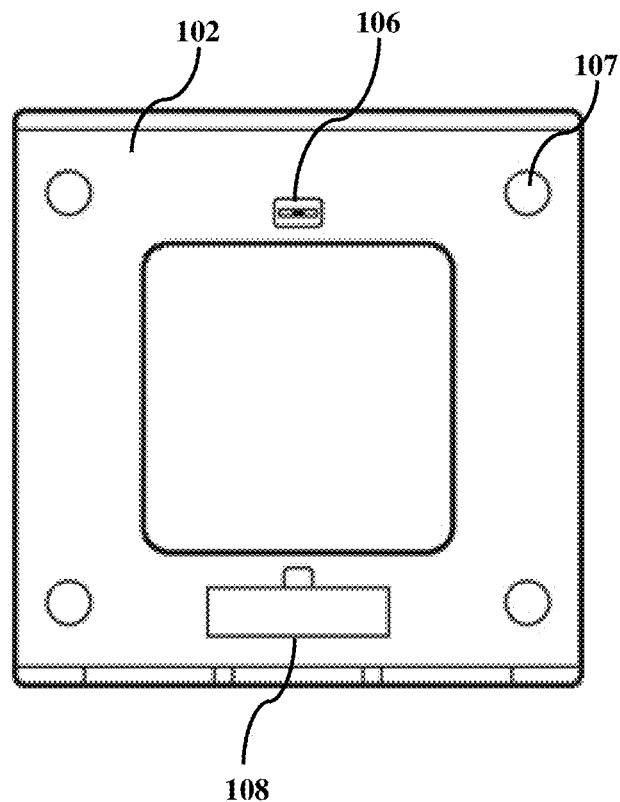
FIG. 2 illustrates a bottom view of a body weight measuring device, according to one embodiment of the present invention.

FIG. 2 illustrates a bottom view of a body weight measuring device, according to one embodiment of the present invention. The body weight measuring device comprises a base 102. The base 102 consists of a platform with a top surface. The platform further consists of a plurality of load sensors and the top surface may be placed over the plurality of load sensors 107. The top surface may include a material such as glass but maybe made of other materials as well. The user stands on the base 102 of the body weight measuring device and measures weight. The body weight measuring device may also comprise an lbs./kg/st selection switch 106. The body weight measuring device may further comprise a battery compartment 108 for storing one or more batteries. There may also be a battery inside the body weight measuring device. The internal battery may power a time clock in the body weight measuring device. The second battery that a user may insert in battery compartment 108 may be for general function such as switching ON the device, measuring weight of the user, processing (calculating BMI, difference calculation), displaying the result, and powering the radio embedded in the body weight measuring device.

Figure 3:
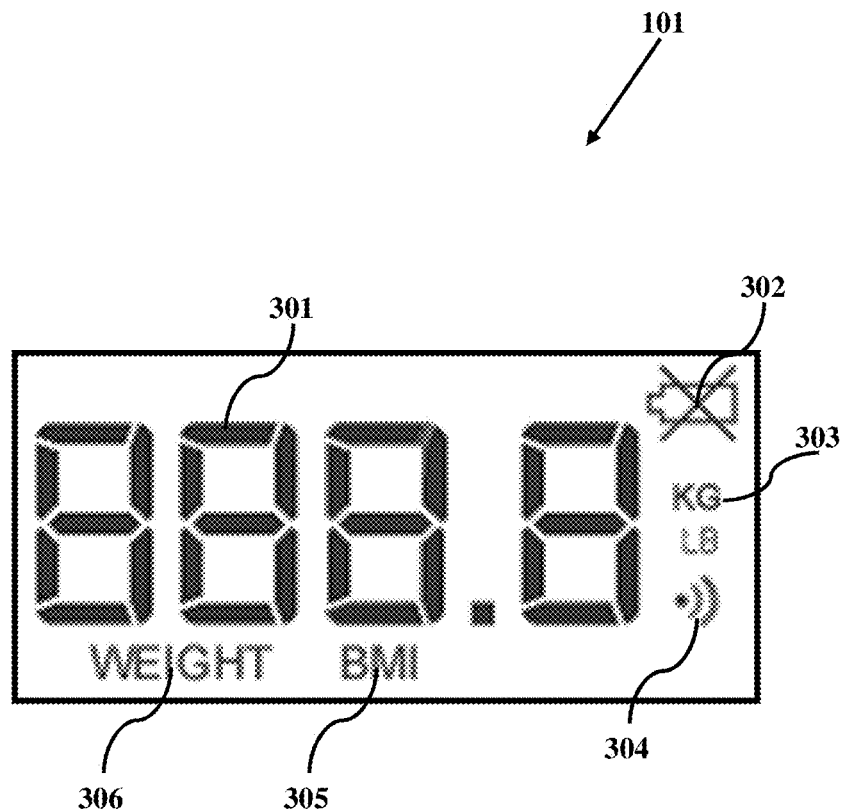
FIG. 3 illustrates a digital display screen of a body weight measuring device, according to one embodiment of the present invention.

FIG. 3 illustrates a digital display screen of a body weight measuring device, according to one embodiment of the present invention. The digital display screen 101 may be for displaying information such as weight 306 in kg or lb. or st (not shown) 303, BMI 305, low battery indication 302, User1 (U1) or User2 (U2) or Guest user number (between U3-U10) indication, communication status with the server 304, reading reminder, error indications, and access point setup mode. The information may be displayed in the digital format 301 as shown in FIG. 3. The reading reminder may be displayed on the digital display screen 101. When the processor of the body weight measuring device receives a message from the radio to turn ON the reading reminder for USER1 then the processor may cause display of U1 on the digital display screen 101 and/or flash the LED in the User 1 button 103 and also may provide an audible sound (for example, a buzz or a beep) for a pre-set time (for example, 2 sounds/sec followed by 3 second wait). The body weight measuring device may detect a low battery condition and display a low battery indication on the digital display screen 101 using the low battery icon 302. If a first user selects first button, a user flag indicator U1 may be displayed on the digital display screen 101 of the body weight measuring device. The LED in the U1 button may also be lit up and the light may stay lit during the process. The user flag indicator "U1" may stay on the digital display screen until the weight reading is completed and the weight reading appears on the screen. Similarly, if a second user U2 selects second multifunction configurable button, a user flag indicator U2 may be displayed in the digital display screen of the body weight measuring device. The LED in the U2 button may also be lit up and stay lit during the process. The user flag indicator "U2" may stay on the digital display screen until the weight reading is completed and the weight reading appears on the screen. The guest user with user number between U3 to U10 may select the guest button. Guest user may select the guest button repeatedly until his or her user flag indicator between U3 to U10 is displayed in digital display screen. When the GUEST button is first pressed "U3" may be displayed on the digital display screen. The lamp in the GUEST button may also light up and the light may stay lit during the process. The user flag indicator "U3" may stay on the digital display screen until the blood pressure reading is completed and the blood pressure reading appears on the screen. If the GUEST button is pressed twice, "U4" may be displayed on the digital display screen.

According to one embodiment of the present invention, the processor displays "0.0" on the digital display screen 101, when the body weight measuring device is ready to take a reading of the weight 306. Once "0.0" is displayed, the user may step on the body weight measuring device and measure his or her weight.

Figure 4:
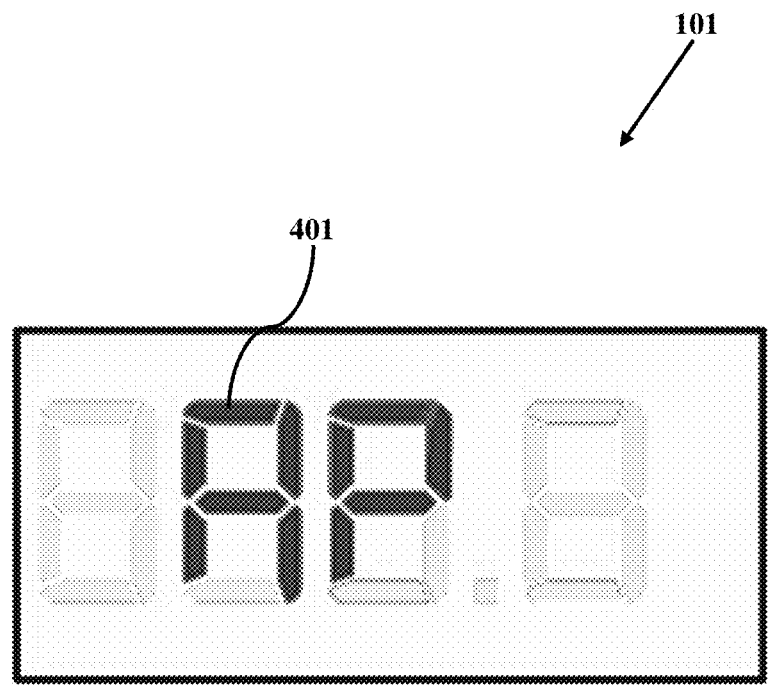
FIG. 4 illustrates an access point enabled mode in a digital display screen of a body weight measuring device, according to one embodiment of the present invention.

According to one embodiment of the present invention, the first user U1 activates the radio to connect with the server. The radio may be first activated by inserting the external battery into the slot provided in the body weight measuring device. Upon inserting the external battery 108, the radio may be activated as an access point and the digital display screen 101 may show AP 401 as illustrated in FIG. 4. The AP indicator (icon) 401 may be displayed in the digital display screen 101 until it times out after a configurable interval of time.

A user may connect to the body weight measuring device in the access point mode using a computing device with a radio. User can now pull up the web page 601 of the body weight measuring device and update the router details like name and password.

According to one embodiment of the present invention, when processor receives a message from the radio that the communication with server has started, then the processor may cause the icon 304 on the digital display screen 101 to blink. The blink rate may be 1 second "ON" and 2 second "OFF" format. Similarly, when the processor receives a message from the radio that the radio may be communicating with the server, then the processor may stop causing the icon 304 to blink and leave the icon in an ON state on the digital display screen 101. Similarly, when the processor receives a message from the radio that the communication with server has ended, then the processor may turn OFF the icon 304 on the digital display screen 101.

FIG. 4 illustrates an access point enabled mode in a digital display screen of a body weight measuring device, according to one embodiment of the present invention. With respect to FIG. 4, a user may insert the external battery into the slot 108 provided in the body weight measuring device. The insertion of the external battery in the slot may activate the radio. The radio may go into access point mode and display AP 401 on the display screen. The wireless signal of the access point may be detected by a computing device of the user. After connecting the computing device to the access point, the user may open a webpage 601 and update the network name (for example, SSID) and network key (password) for a wireless network (for example, a Wi-Fi network), and then disconnect the wireless connection between the computing device and the body weight measuring device. The user may then connect a computing device to the web portal over the Internet and enter the body weight measuring device identification number and their user number against their account information.

Now, the body weight measuring device may connect to the server through the wireless router and updates may occur between the two. Similar to first user, second user may follow the same procedures for measuring and uploading the weight.

Figure 5:
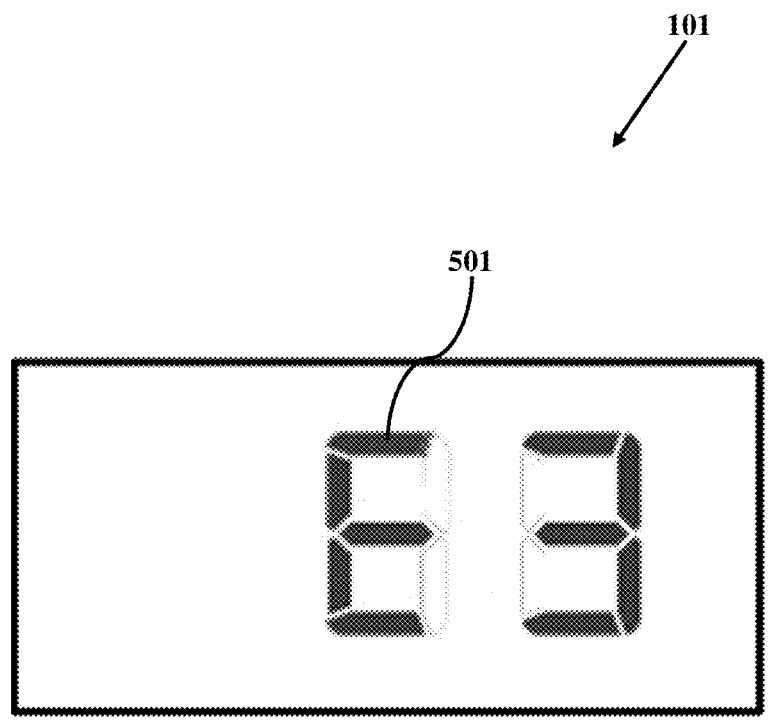
FIG. 5 illustrates an error indicator in a digital display screen of a body weight measuring device, according to one embodiment of the present invention.

FIG. 5 illustrates an error indicator in a digital display screen of a body weight measuring device, according to one embodiment of the present invention. When the processor receives a message from the radio that communication with the server has failed, then the processor may cause display of an error indication such as "E3" 501 on the digital display screen 101 of the body weight measuring device as shown in FIG. 5. The error indications may include but not be limited to "EE" for low voltage or interior circuit problem 501, E1, E2, E3 for server communication failures and E4 radio communication failure. Other error modes or conditions can be similarly defined.

Figure 6:
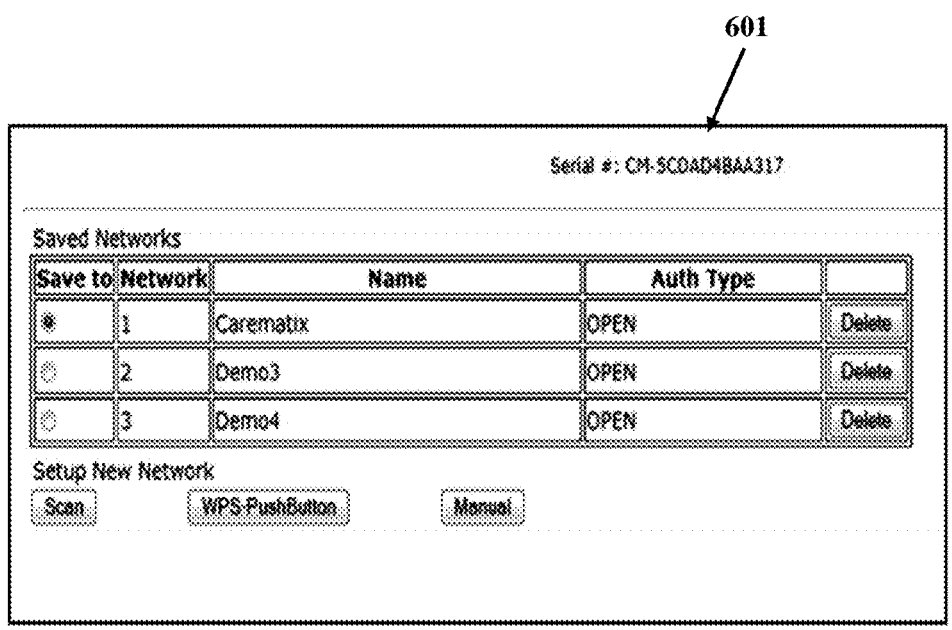
FIG. 6 illustrates a graphical user interface for configuring a body weight measuring device, according to one embodiment of the present invention.

FIG. 6 illustrates a graphical user interface for configuring a body weight measuring device, according to one embodiment of the present invention. The configuration page 601 may be displayed via the portal. The configuration page may provide for configuring the body weight measuring device and may display a list of saved networks (if there are any). Under the saved networks box, three buttons (Scan, WPS-Push Button, and Manual) may be provided as shown in FIG. 6. The buttons (Scan, WPS-Push Button and Manual) may be used for setting new network connections. Upon selecting the Scan button, lists of active wireless networks may be displayed. The user may select at least one network, type the password into the "credential" field next to the network's name, and press "connect" for connecting to the preferred network. If the body weight measuring device connects to a network, a "Successfully connected" message may be displayed. If a connection is not established, an error message "Check the password and try again, or try one of the other connection methods" may be displayed.

If the wireless router is a Wi-Fi router and has a WPS-Pushbutton, then the method for setting a new network may include the steps of selecting a WPS-button on the Wi-Fi router and selecting WPS-Pushbutton on the configuration page. If the body weight measuring device connects to the network then a message may be displayed indicating "Successfully connected".

If the user has the SSID, WEP Key, or WPA password for a particular Wi-Fi network, then the method for setting a new network may comprises selecting the "Manual" button on the configuration page and entering the details manually. If the body weight measuring device connects to the network then a message may be displayed indicating "Successfully Connected".

Figure 7:
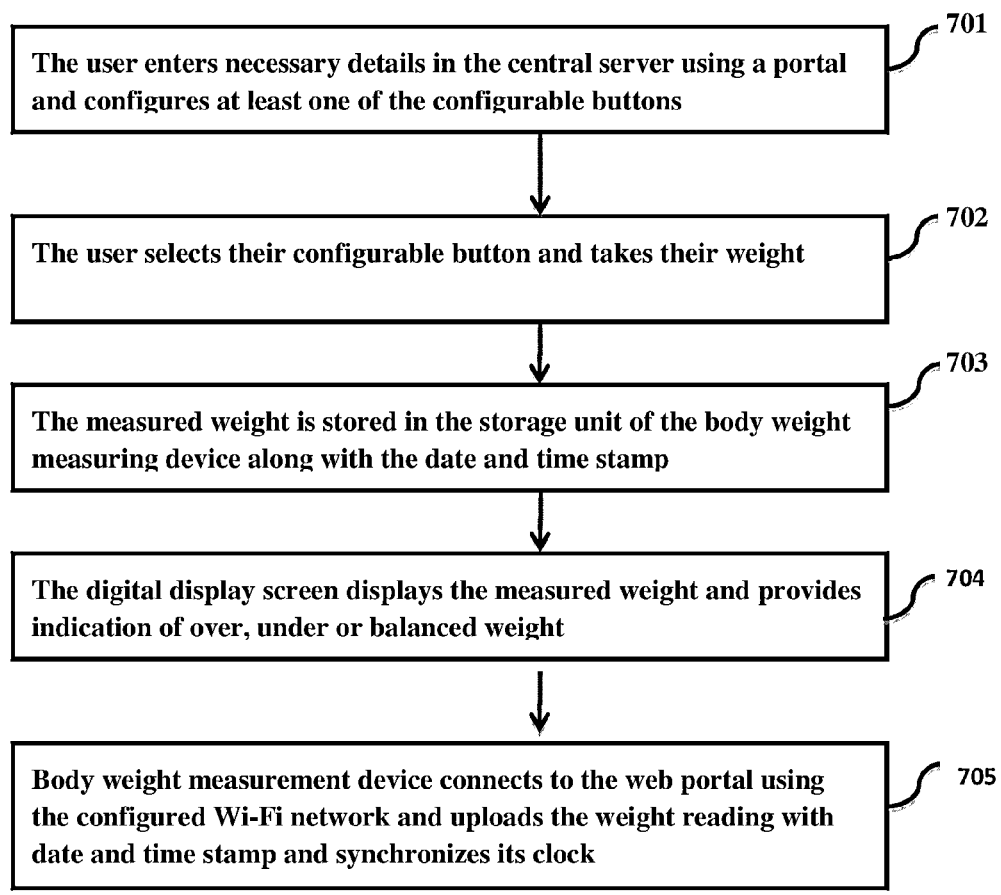
FIG. 7 is a flow chart illustrating an operation of a body weight measuring device for measuring a weight of a user, according to one embodiment of the present invention.

FIG. 7 is a flow chart illustrating an operation of a body weight measuring device for measuring a weight of a user, according to one embodiment of the present invention. With respect to FIG. 7, a user may connect the body weight measuring device with a desired computing device and update the wireless network identification (for example, Wi-Fi SSID) and password (credential). The user may then disconnect the computing device from the body weight measuring device and connect to the portal and enter the body weight measuring device identification number through the web portal. The portal may prompt the user to configure certain buttons after entering the identification number of the body weight measuring device. The user may select a desired button and enter credential such as name, age, and height etc. Once the information is entered through the portal (701), the body weight measuring device may be configured with at least one multifunction button. The user may disconnect the computing device from the server. The configured user may select the corresponding multifunction configured button and measures weight (702). Similarly, another user (who is not yet configured) follows the same process of configuring another multifunction configurable button. Once the user measures weight, the measured weight may be stored in a storage unit of the body weight measuring device with the date and time stamp (703). The processor may process the stored details in the storage unit and display on the digital display screen along with details such as overweight, underweight or balanced weight conditions for the user (704). The body weight measurement device may then connect to the server using the configured wireless network and upload the weight reading with date and time stamp to the user account (705). At this time it may also synchronize its time clock.

The body weight measuring device of one or more embodiments of the present invention provides an accurate measurement of weight for all kinds of users (old age, obese, physically disabled, senile tremor patients, etc.) by detecting and calculating the average of the extreme values for the lowest allowable variation (say ±0.1 lbs.) in the weight. It also may track the time it takes to arrive at this averaged value. This time may be reported to the portal along with the weight reading and date and time stamp. This then can be used to track the state of unbalance or steadiness of the user.

A time clock may be maintained in the body weight measuring device using an internal battery. This clock may be synchronized with the portal clock whenever the body weight measuring device connects to the portal.

A user may set reminders through the portal to their account to remind the user to complete a task like taking a weight. Whenever the body weight measuring device communicates with the portal it may download and store such a reminder. At the reminder time, the respective user button turns ON and the display shows the user number (e.g., U1), and there may be an audible sound to remind the user to complete the task.

The body weight measuring device may be portable and may also be easily operated by a semi-skilled or a normal user.

As recited above, one or more embodiments of the present invention provide a body weight measuring device with kick buttons. One or more of the buttons may light up, illuminate, and/or are otherwise identified by light when one or more of the buttons are pressed. Additionally, one or more of the buttons may light up, illuminate, and/or are otherwise identified by light when it is time to take a reading. Additionally, a user may set up alarm times via the portal. These alarm times maybe downloaded to the body weight measuring device and the body weight measuring device may provide an audible or visible indicator (such as a beeping sound or a flashing light) when the alarm time has arrived. Additionally, the body weight measuring device may provide an indicator on an LCD screen and/or light up a kick button to provide a reminder to the user to take a weight reading.

Additionally, one or more embodiments of the present body weight measuring device allow a person who may be unstable or with a muscular twitch and/or tremor to successfully take a weight reading. In operation, once the weight reading is fluctuating within an acceptable range, it may be averaged and transmitted. For example, in the event of a tremor that causes the weight reading to fluctuate, the weight reading may be monitored for a predetermined time (such as 5 or 10 seconds) and then averaged. If the height of the fluctuation of the weight reading caused by the tremor is less than a cut-off threshold (such as 2%, 3%, 5%, and/or 10%, for example) then the average of the weight recorded for the predetermined time may be transmitted as a weight reading.

Additionally, the length of time required to reach the average reading may be tracked, recorded, and/or transmitted with or separately from the weight reading. Tracking the length of time required to reach the average reading may provide input into a determination as to whether the person may be becoming more unsteady over time, for example through the progression of Parkinson's Disease.

Figure 8:
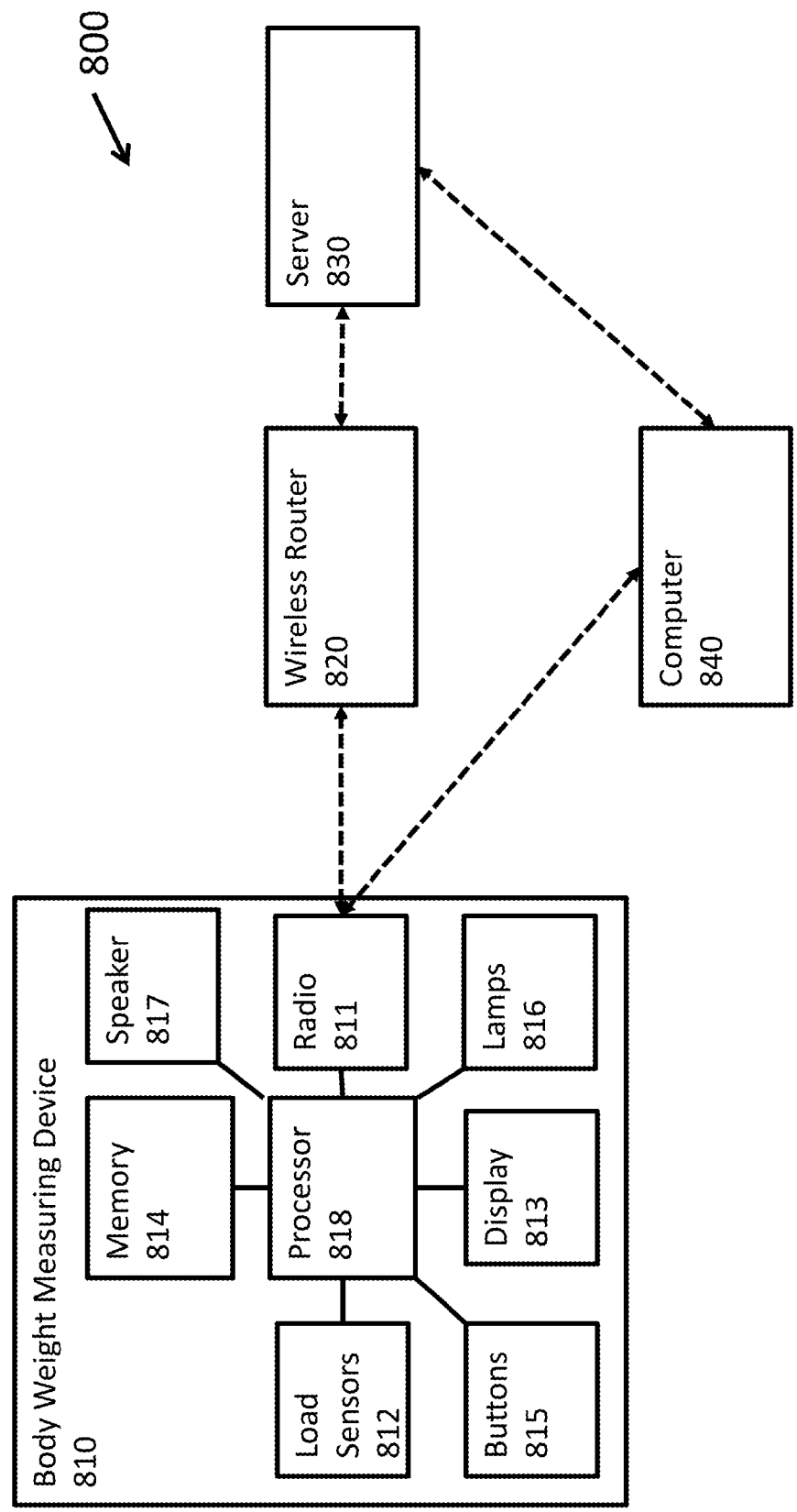
FIG. 8 illustrates a body weight measuring system, according to certain inventive techniques.

FIG. 8 illustrates a body weight measuring system 800, according to certain inventive techniques. The system may include a body weight measuring device 810, a wireless router 820, a server, 830, and a computer 840. The device 810 may communicate wirelessly with the router 820, which in turn may communicate with the server 830 via a network such as the Internet. Thus, the device 810 may communicate with the server 830 via the router 820. A computer 840 may communicate with the server 830 through a portal via a network such as the Internet. The computer 840 may also wirelessly communicate with the device 810.

The device 810 may include a radio 811, load sensors 812, a display 813, memory 814, buttons 815, one or more lamps 816, a speaker 817, and a processor 818. The radio 811, display 813, speaker 817, and lamps 816 may be controlled by the processor 818. The load sensors 812, buttons, 815, and radio 811 may provide information to the processor 818.

The radio 811 may include a transceiver that wirelessly transmits and receives signals to/from the router 820 and/or computer 840. The radio 811 may include a Wi-Fi transceiver (for example, a transceiver that is compliant with the Institute of Electrical and Electronics Engineers' 802.11 standards). The processor 818 may transmit data to the radio 811, which in turn transmits the data to the router 820 or computer 840.

The radio 811 may also communicate wirelessly received data to the processor 818. The radio 811 may communicate other information with the processor 818, such as whether a wireless link exists, the identity of wireless nodes and networks, error messages, or the like.

The load sensors 812 (for example, load cells) may generate a signal (for example, load information) in response to an applied load. There may be four load sensors 812 (for example, in the arrangement depicted in FIG. 2). Load information may be communicated from the sensors 812 to the processor 818 where it is received. The load information may be used to determine a weight a load (for example, a weight of a user) on the device 810.

The display 813 may be an LED, LCD, or other type of display. The display 813 may be backlit. The display 813 may receive display information from the processor 818 and responsively form a visual arrangement to communicate the display information to a user.

The memory 814 may be a volatile or non-volatile memory and may communicate with the processor 818. The memory 814 may store various types of information disclosed herein. The memory 814 may be integrated with the processor 818, for example, in a chip. The memory 814 may include one or more memories. Similarly, the processor 818 may include one or more processors.

Buttons 815 may include buttons that can be actuated by a user. The buttons 815 may be arranged to be pressed by hand or by foot (for example, a kick button). Kick buttons may be located proximally, in, or on a front surface of the device 810 (for example, a surface below a top surface of the device 810). Some of the buttons 815 may be configurable. For example, actuation of some buttons 815 may cause the processor 818 to perform a user-configurable activity. Such activity may be configurable through the computer 840. The computer 840 may program the device 810 to perform a configurable activity either through direct communication with the device 810 or communication through the server 830 and the router 820. Configurable parameters discussed above may be stored in the memory 814. According to certain inventive techniques, User 1 and User 2 buttons are configurable to cause the device 810 to communicate weight and related readings to the server 830 associated with a given user. Other buttons may include a power button, a radio enable/disable button, an illumination button, or a Guest button. The Guest button may not be configurable and may not cause the device 810 to communicate weight and related readings to the server 830.

Lamps 816 may cause illumination of various parts of the device 810. For example, one lamp 816 may illuminate the display 813 (from the front or back). Other lamps 816 may illuminate buttons 815. For example, a lamp 816 may provide visual feedback to a user to indicate that a button 815 has been pressed. A lamp 816 may be used as a reminder to the user to take action, as will be further discussed below. A lamp 816 may include one or more LEDs or other light-emitting devices.

A speaker 817 may generate sounds. For example, the speaker 817 may make beeps or other sounds to alert a user to a given condition (for example, low battery or loss of network connectivity) or alarm time, as will be discussed in more detail below.

According to certain inventive techniques, the processor 818 may receive load information from the sensors 812. From this load information, the processor 818 may determine weight information that corresponds to the weight of a user. From the load information or the weight information, the processor may determine stability information. The stability information may be a metric that quantifies the perceived stability of a user on the device 810.

One way of determining stability information is as follows. The processor 818 determines weight information over time from the load information. The processor 818 may determine how long it takes for the weight information to stabilize. This duration may be a type of stability information. To determine the duration, the following procedure may be implemented. First, a stability threshold is predetermined. Such a threshold may be ±0.1 lbs. (although other types of thresholds could be applicable, such as ±0.1% of the total weight). Second, a number of required stable readings is predetermined. Such a number may be eight. Weight information is then generated periodically (for example, once every 62.5 ms, or 16 samples per second). A timer is started once the first weight has been determined. After a weight determination has been made, the weight is compared to the previously determined weight. If the difference between the two weights is less than the threshold, then a counter is increased. If the difference between the two weights is greater than the threshold, then the counter is reset to zero. Once the counter reaches the required number of stable readings, the timer is checked to determine the duration of the stabilization process. This duration may be a type of stability information. For example, if the duration is around four seconds, the user may be relatively stable. If the duration is eight or more seconds, the user may be relatively unstable.

If the weight does not stabilize within 10 seconds, then the stabilization algorithm may restart, but using a greater threshold, such as ±0.2 lbs. If this threshold does not result in sufficient stabilization, then the threshold may be increased to ±0.4 lbs., for example, and the process is repeated.

Stability information may include information other than the duration discussed above. Stability information may include raw or processed data for each of the load sensors averaged or over time. For example, stability information may include a series of readings from each of the load sensors over a period of time. Stability information may include raw or processed weight information averaged or over time. Stability information may include left and right foot stability information averaged or over time. Left foot information may correspond to two left-side load sensors. Right foot information may correspond to two right-side load sensors.

Using the weight information and/or stability information, the processor 818 may generate reading information. Reading information may include other information, such as time stamp information. The time stamp information may correspond to a time of day (that is, a circadian time) at which a reading was taken. Such time stamp information may be approximate, for example, when the reading information includes a series of data taken over time (for example, the time stamp may correspond to the last data obtained).

The reading information may also include information identifying a selected user. For example, such identifying information may be established when a user actuates the User 1 or User 2 button. Some or all of the reading information (for example, weight information and stability information) may be displayed on the display 813. Some or all of the reading information may be transmitted by the radio 811 to the server 830 via the router 820.

According to certain inventive techniques, the device 810 can provide alerts to alert a user as to an event, such as an alert for the user to weigh himself or herself. The device 810, through the radio 811, may receive one or more weight reading time from the server 830 or from the computer 840. According to one illustrative example, only one weight reading time is received. The weight reading time is stored in the memory 814. The processor 818 includes a time clock which is checked against the weight reading time. When the time clock is greater than or equal to the weight reading time, the processor causes an alert to be emitted through an alert indicator. The alert indicator may be the speaker 817 and/or one or more of the lamps 816. For example, the speaker 817 may emit a sound (for example, a beep or buzz). As another example, a lamp 816 may illuminate. According to one example, a given user button (for example, a kick button) is illuminated to alert the user that it is time to measure weight.

The following example is illustrative of the operation of system 800. The device 810 has three kick buttons—User 1, User 2, and Guest. An individual employs the computer 840 to wirelessly communicate with the device 810. The computer 840 sets up the device 810 to wirelessly communicate with the router 820. The individual also employs the computer to communicate with the server 830 via a portal. The device 810 is set up by storing device 810 identifying information (for example, serial number) in the server via the portal. The individual also employs the computer 840 to enter details about two users of the device 810 into the server 830. These details include each user's name, height, weight, and age. In this example, User 1 is set up as Jim, who is 5'10", 180 lbs. (initially), and 35 years old. User 2 is set up as Jane, who is 5'5", 120 lbs. (initially), and 32 years old. This information is then transmitted from the server 830 to the device 810 via the router 820. It should be understood that such information may be communicated directly from the computer 840 to the device 810. The device 810 may, in turn, communicate such information to the server 830 via the router 820.

The individual also employs the computer 840 to enter weight reading alarm times for Jim and Jane into the server 830. Alarms are set for Jim at 6:30 AM on Monday-Friday and at 8:00 AM on Saturday and Sunday. Alarms are set for Jane at 6:00 AM on Monday-Friday and at 7:30 AM on Saturday and Sunday. It should be understood that such information may be communicated directly from the computer 840 to the device 810. The device 810 may, in turn, communicate such information to the server 830 via the router 820.

When the time clock of the device 810 reaches one of Jim's alarm times (Monday at 6:30 AM), the device 810 emits a beep characteristic for User 1 and illuminates the User 1 kick button. Jim is thus prompted to measure his weight. Jim walks to the device 810 at and actuates the illuminated User 1 kick button. The lamp turns off, and thus the User 1 kick button is no longer illuminated by the lamp. Jim then steps on the device 810 at 6:32 AM and reading information is generated. Jim is now 182 lbs. It took 4.5 seconds for Jim's weight to stabilize on the device 810. The device 810 then transmits the following information to the server 830: User 1; 182 lbs.; 4.5 seconds to stabilize; 6:32 AM on Monday. The server 830 then stores this information under Jim's profile.

Jim then logs into the server 830 with computer 840 and views his weight over time in the portal. Jim sees that his weight has gone up. Jim also views his stability over time. Jim sees that he has become more stable.

When the time clock of the device 810 reaches one of Jane's alarm times (Tuesday at 6:00 AM), the device 810 emits a beep characteristic for User 2 and illuminates the User 2 kick button. Jane is thus prompted to measure his weight. Jane walks to the device 810 at and actuates the illuminated User 2 kick button. The lamp turns off, and thus the User 2 kick button is no longer illuminated by the lamp. Jane then steps on the device 810 at 6:02 AM and reading information is generated. Jane is now 118 lbs. It took 5.3 seconds for Jane's weight to stabilize on the device 810. The device 810 then transmits the following information to the server 830: User 2; 118 lbs.; 8.3 seconds to stabilize; 6:02 AM on Tuesday. The server 830 then stores this information under Jane's profile.

Jane then logs into the server 830 with computer 840 and views her weight over time in the portal. Jane sees that her weight has gone down. Jane also views he stability over time. Jane sees that she has become less stable. The server 830 has performed additional processing on the stability information, and Jane is notified that she may have one or more conditions affecting her stability.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

The invention claimed is:

1. A body weight measuring device for measuring a weight of a load over a period of time to generate a reading, the body weight measuring device comprising:
    a plurality of load sensors configured to generate load information during the reading, wherein the load information includes a plurality of measurements from each of the plurality of load sensors received over the period of time;
    a radio configured to wirelessly transmit reading information;
    at least one processor configured to:
        receive the load information from the plurality of load sensors;
        analyze the load information to determine weight information;
        analyze at least one of the load information or the weight information to determine stability information, wherein the stability information comprises information specifying a time duration during which the weight information was stabilizing during the reading; and
        communicate the reading information to the radio, wherein the reading information comprises the load information and the stability information; and
    a display configured to receive and display the weight information.

2. The body weight measuring device of claim 1, wherein the plurality of load sensors comprises four load sensors.

3. The body weight measuring device of claim 1, wherein the reading information comprises time stamp information corresponding to a circadian time at which the reading was taken.

4. The body weight measuring device of claim 1, wherein the display is further configured to display at least a portion of the stability information.

5. The body weight measuring device of claim 1, further comprising a plurality of user selection buttons configured to select different ones of a plurality of users, wherein the at least one processor is further configured to include information identifying the selected user in the reading information.

6. The body weight measuring device of claim 1, wherein the stability information comprises a series of readings from each of the plurality of load sensors over a period of time.

7. A method for measuring a weight of a load on a body weight measuring device over a period of time to generate a reading, the method comprising:
  generating load information with a plurality of load sensors during the reading, wherein the load information includes a plurality of measurements from each of the plurality of load sensors received over the period of time;
  generating reading information by analyzing, with at least one processor, the load information to determine weight information, and analyzing, with the at least one processor, at least one of the load information or the weight information to determine stability information, wherein the stability information comprises information specifying a time duration during which the weight information was stabilizing during the reading, and wherein the reading information includes the weight information and the stability information;
  wirelessly transmitting the reading information with a radio; and
  displaying the weight information on a display.

8. The method of claim 7, wherein the plurality of load sensors comprises four load sensors.

9. The method of claim 7, wherein the reading information comprises time stamp information corresponding to a circadian time at which the reading was taken.

10. The method of claim 7, further comprising displaying at least a portion of the stability information with the display.

11. The method of claim 7, wherein the stability information comprises a series of readings from each of the plurality of load sensors over a period of time.

12. A weight measuring system including:
  a body weight measuring device including:
    a radio configured a wirelessly receive at least one weight reading time, wherein the at least one weight reading time comprises time-of-day information;
    an alert indicator configured to emit an alert;
    a memory configured to store the at least one weight reading time;
    a time clock; and
    at least one processor configured to:
      compare the at least one weight reading time with a current time of the time clock, wherein time-of-day information of the current time and time-of-day information of the at least one weight reading time are compared;
      cause the alert indicator to emit the alert if the current time of the time clock is greater than or equal to the at least one weight reading time; and
  a server configured to:
    receive the at least one weight reading time from a portal; and
    transmit the at least one weight reading time to the body weight measuring device.

13. The weight measuring system of claim 12, wherein the alert indicator comprises a speaker and the alert comprises a sound.

14. The weight measuring system of claim 12, wherein the alert indicator comprises a lamp and the alert comprises a light.

15. The weight measuring system of claim 14, wherein the alert indicator comprises a kick button illuminator.

16. The weight measuring system of claim 12, wherein the at least one weight reading time comprises a weight reading time for a first user and a weight reading time for a second user.

17. The weight measuring system of claim 12, wherein the at least one weight reading time comprises day-of-week information.

18. The weight measuring system of claim 17, wherein the at least one weight reading time comprises a first weight reading time on a first day-of-week and a second weight reading time on a second day-of-week different from the first day-of-week.

* * * * *